United States Patent
Bernadat et al.

(10) Patent No.: US 6,931,571 B2
(45) Date of Patent: Aug. 16, 2005

(54) METHOD AND APPARATUS FOR HANDLING TRANSIENT MEMORY ERRORS

(75) Inventors: Philippe Bernadat, Varces (FR); Dejan Milojicic, Palo Alto, CA (US); Guangrui Fu, Palo Alto, CA (US); Alan Messer, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 519 days.

(21) Appl. No.: 09/991,575

(22) Filed: Nov. 20, 2001

(65) Prior Publication Data

US 2003/0097606 A1 May 22, 2003

(51) Int. Cl.[7] ................................................. G06F 11/00
(52) U.S. Cl. ........................... 714/25; 714/42; 714/53; 714/54
(58) Field of Search ............................... 714/25, 48, 42, 714/49, 54, 53, 20

(56) References Cited

U.S. PATENT DOCUMENTS

| | | | | |
|---|---|---|---|---|
| 6,012,157 A | * | 1/2000 | Lu | ............................. 714/741 |
| 6,530,036 B1 | * | 3/2003 | Frey, Jr. | ........................ 714/6 |
| 6,609,184 B2 | * | 8/2003 | Bradshaw et al. | ........... 711/162 |
| 6,622,269 B1 | * | 9/2003 | Ngo et al. | ................... 714/718 |
| 6,647,517 B1 | * | 11/2003 | Dickey et al. | ................ 714/48 |
| 6,665,689 B2 | * | 12/2003 | Muhlestein | ................. 707/204 |
| 6,697,971 B1 | * | 2/2004 | Dwyer | ......................... 714/54 |
| 6,701,451 B1 | * | 3/2004 | Cohen et al. | ................... 714/5 |
| 6,715,036 B1 | * | 3/2004 | Burton et al. | ............... 711/118 |

\* cited by examiner

*Primary Examiner*—Robert Beausoliel
*Assistant Examiner*—Yolanda Wilson

(57) ABSTRACT

Method and apparatus for managing memory of a data processing system. In one embodiment, memory objects are allocated in response to memory allocation requests. Each object has an associated plurality of addresses. Type-identifier codes are respectively stored in association with the memory objects. Upon detection of a transient memory error at a memory address a recovery action is selected and performed based on the type-identifier code of the object that is associated with the erring memory address.

21 Claims, 2 Drawing Sheets

METHOD AND APPARATUS FOR HANDLING TRANSIENT MEMORY ERRORS

FIELD OF THE INVENTION

The present invention generally relates to memory management in data processing systems, and more particularly to handling transient memory errors.

BACKGROUND

Society's demand for high-availability computing systems is growing along with society's dependency on computers for various services. For example, Internet Data Centers (IDC), Internet Service Providers (ISP), or Application Service Providers (ASP) provide the support for many computing needs. To meet the demand in a way that is affordable to users, computing systems are increasingly being built with commodity hardware and software. Unfortunately, reliability is sometimes sacrificed in systems with commodity parts.

For example, commodity memory components are susceptible to soft errors. A soft error is a transient memory error that has been detected by the hardware but not corrected. Many operating systems respond to soft errors by halting and then rebooting. System reboots are costly in terms of lost production time. If the resources of an IDC, ISP, or ASP are unavailable because of a system reboot, customers' needs may be unmet or frustrated. If computing resources are unavailable too often or for too long, customer dissatisfaction and customer defections may result. Thus, while commodity parts address the requirement of affordability, the requirement of high availability may be sacrificed.

A method and apparatus that address the aforementioned problems, as well as other related problems, are therefore desirable.

SUMMARY OF THE INVENTION

The invention provides in various embodiments methods and apparatus for managing memory of a data processing system. In one embodiment, memory objects are allocated in response to memory allocation requests. Each object has an associated plurality of addresses. Type-identifier codes are respectively stored in association with the memory objects. Upon detection of a transient memory error at a memory address a recovery action is selected and performed based on the type-identifier code of the object that is associated with the erring memory address.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the invention categorizes memory objects and responds to memory errors by selecting a course of action based on the category of the object in which the memory error occurred. The course of action may include, for example, ignoring the error, signaling the task that was executing when the error occurred, restarting a system call or I/O operation, reloading program code into a text area, recovering data prior to a read error (e.g., rebuilding a page table entry, reconstructing a linked list, or recopying memory from user space), reloading a page from storage, or refilling a page with zeros if the page hasn't been modified, or as a last resort halting the system if necessary. Thus, a system in which the invention is implemented has numerous recovery actions that are available as alternatives to system halts and reboots, and the actions can be tailored to the context in which the memory error occurred. Such a system is less susceptible to unnecessary halts and reboots.

Figure 1:
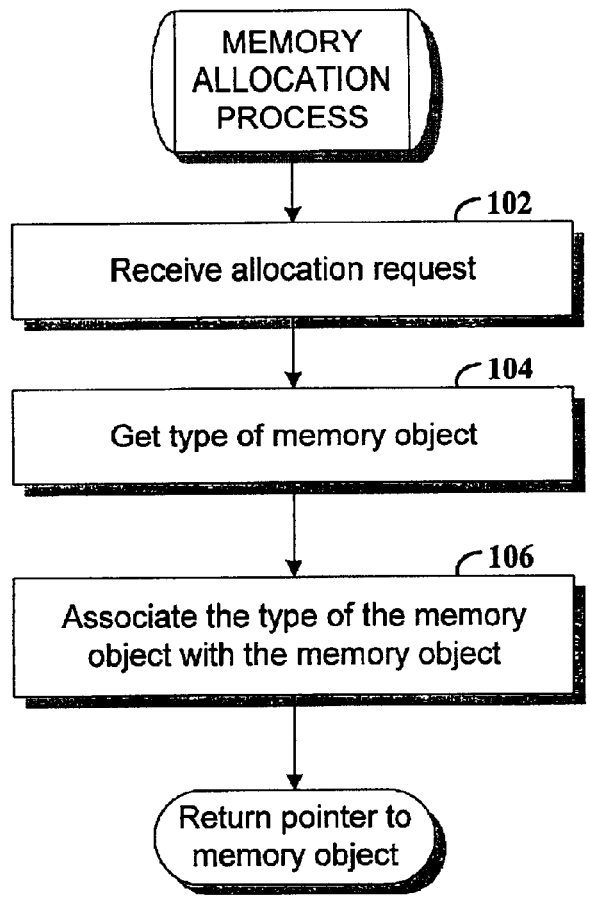
FIG. 1 is a flowchart of an example process for allocating memory.

FIG. 1 is a flowchart of an example process for allocating memory in accordance with one embodiment of the invention. The memory allocation process is implemented by the operating system and is used by the operating system and by application programs to allocate memory for use during program execution.

At step 102 a memory allocation request is received. The request includes a requested quantity of memory. In another embodiment, the request specifies the type of memory object. By reference to the memory address or object type, the memory manager identifies the cluster of memory objects with which the requested memory object is to be associated. At step 104, the process determines the type of object to which the memory is to be allocated. For example, in one embodiment, the objects are categorized into operating system objects, user application objects, and objects beyond the control of the operating system.

Operating system objects include, for example, task descriptors, I/O buffers, file handles, the kernel stack and other objects. An application object is any memory object allocated to and accessed by an application program (a program other than the operating system). Those memory objects beyond control of the operating system are those that are manipulated by system firmware, for example objects accessed by a BIOS. In one embodiment, an object type is identified by reference to the value of the program counter to which control is to return upon allocation of the object. The value of the program counter uniquely identifies the requester. In another embodiment, the type of the object is passed as a parameter to the allocation process. In yet another embodiment, a shorter object-type identifier is generated using intermediate preprocessor macros. The preprocessor macro converts the program counter value into an index, for example, a byte-sized integer. The index is used to store the real program counter value in an intermediate table, and used thereafter for reading the program counter value from the table.

The granularity with which objects are categorized refers to the degree to which the system can differentiate between memory errors in different locations. For example, depending on system requirements, the granularity by which operating system objects are categorized can be relatively fine. A fine granularity makes easier the task of selecting a suitable course of action. That is, with smaller objects a wider variety of error responses can be programmed with knowledge of the uses of the objects. For objects belonging to application programs, the granularity can be coarse since the application will either be terminated or signaled if the application is programmed to handle a soft error.

At step 106, the type of the memory object is associated with the object. The association is established so that when a soft memory error is detected, the type of the object in which the memory error occurred can be determined and appropriate action taken. In one embodiment, a type code that describes the object type is stored at a fixed offset within the object itself. A pointer to the allocated memory object is then returned to the requester.

Figure 2:
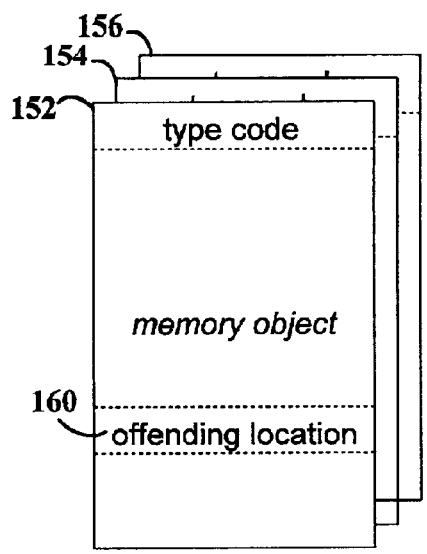
FIG. 2 is a block diagram of multiple memory objects established in accordance with one embodiment of the invention.

FIG. 2 is a block diagram of multiple memory objects established in accordance with one embodiment of the invention. Each of blocks 152, 154, and 156 represents a memory object. It will be appreciated that FIG. 2 is limited to three objects for illustrative purposes only. Within each memory block an associated type code is stored. The type code, for example, a program counter value, indicates the type of object to which the memory is allocated.

In an alternative embodiment, if multiple objects of the same type are clustered in a selected area of memory, the object type code is stored in a header that is used to manage the objects in the cluster. As between clusters of different types of objects, the object type codes are stored in the headers at the same offset for ease of reference in determining the type of object in responding to a memory error. Because in some applications objects are infrequently allocated, different types of objects may be clustered in a selected memory area to reduce the overhead associated with maintaining a cluster for each type of object. For clusters having mixed object types, the object type codes are stored in the objects as shown in FIG. 2.

Within object 152, offending location 160 represents an example address at which a soft error is detected. When a soft error is detected, the object to which the offending address belongs is determined, and then the type of the object is determined from the associated type code. Based on the object type, the operating system decides on a suitable course of action. For example, if the object belongs to an application program, the operating system either signals the application that a soft error was detected or ends the application.

Figure 3:
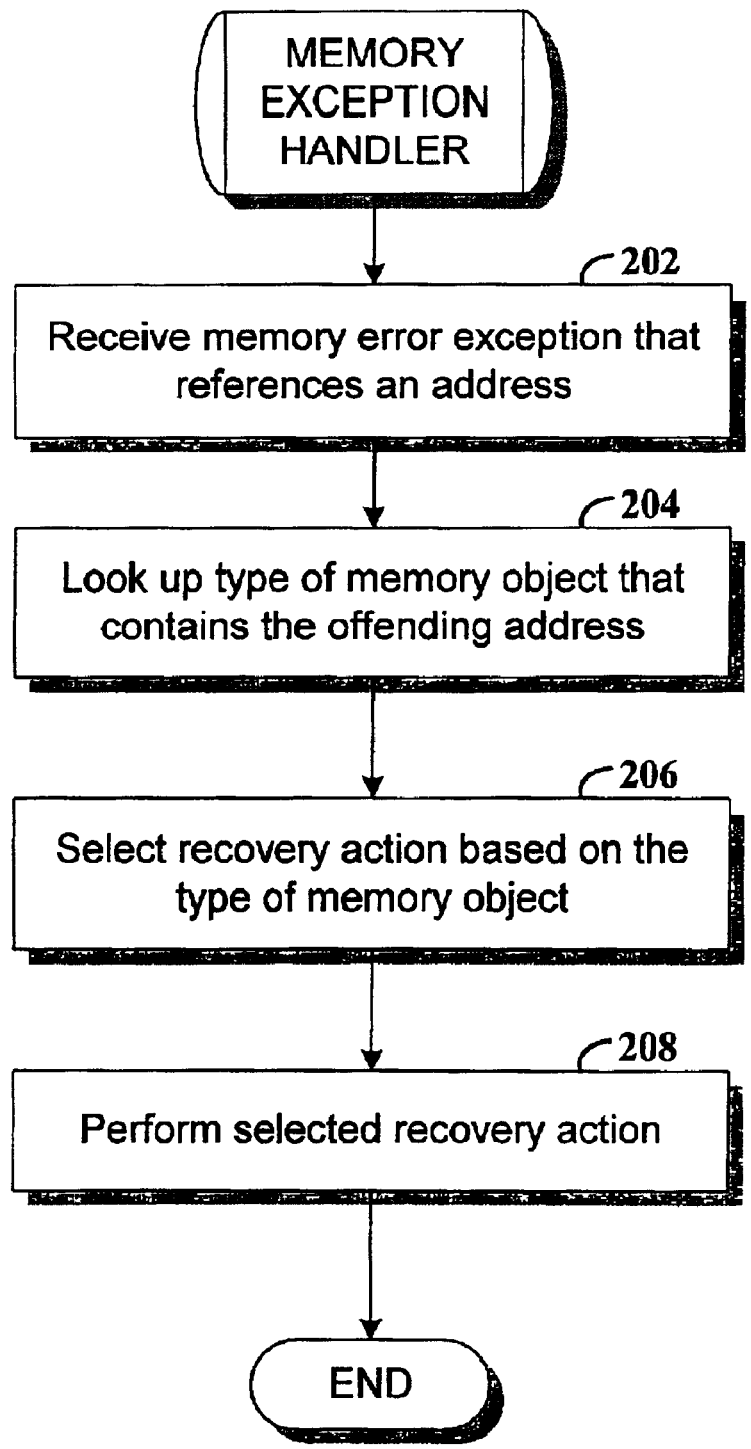
FIG. 3 is a flowchart of an example process for handling memory errors.

FIG. 3 is a flowchart of a process for handling memory errors in accordance with one embodiment of the invention. A memory-error exception handler is invoked when the hardware detects a soft error. At step 202, the exception handler begins the process with an input memory address of the location at which the error was detected.

At step 204, the exception handler looks up the type of object to which the input address belongs. In one embodiment, the operating system groups into clusters objects of the same type and same size. Thus, to identify the type of the object in which the offending address resides, the exception handler first finds the cluster base address that is nearest and less than the offending address. From the cluster base address, the object is determined (each object in a cluster is of the same size). Once the object is identified, the type code is read from the predetermined location in the object.

At step 206, a recovery action is selected and performed based on the type code read from the object. For example, in one embodiment the recovery actions include ignoring the error, signaling the application, halting the system or fixing the error. To fix an error, for example, a write operation is retried in response to a write error. If an error occurs in a program text segment, the operating system reloads the page associated with the offending address. For an I/O buffer, the operating system may re-execute the I/O operation. If the offending address is associated with an object wherein the correctness of the data does not affect semantics of the operating system, the error is logged.

In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method of managing memory of a data processing system, comprising:
    allocating memory objects in response to memory allocation requests, each object having an associated a plurality of addresses;
    storing type-identifier codes in association with memory objects, respectively, wherein each type-identifier code is a program counter value from which allocation of memory is requested; and
    responsive to a transient memory error at a memory address, identifying the memory object associated with the memory address, obtaining the type-identifier code associated with the memory object, selecting one of a plurality of recovery actions using the type-identifier code as selection criteria, and performing the one of the recovery actions.

2. The method of claim 1, further comprising storing the type-identifier codes within the memory objects, respectively.

3. The method of claim 2, wherein an operating system manages resources of the data processing system for use by application programs executing on the data processing system, and a first type-identifier code identifies memory objects used by the operating system and a second type-identifier code identifies memory objects used by the application programs.

4. The method of claim 2, wherein the one of the recovery actions comprises disregarding the error.

5. The method of claim 2, wherein the one of the recovery actions comprises signaling an application program if the address of the memory error is associated with a memory object allocated to the application program.

6. The method of claim 2, wherein the one of the recovery actions comprises halting the operating system.

7. The method of claim 2, wherein the one of the recovery actions comprises logging information that describes the memory error.

8. The method of claim 2, wherein an operating system manages resources of the data processing system for use by application programs executing on the data processing system, and a first type-identifier code identifies memory objects of a first type used by the operating system, a second type-identifier code identifies memory objects of a second type used by the operating system, a third type-identifier code identifies memory objects used by the application programs, and for errors in memory objects associated with the second type-identifier code, the one of the recovery actions logs information that describes the memory error.

9. The method of claim 1, wherein an operating system manages resources of the data processing system for use by application programs executing on the data processing system, and a first type-identifier code identifies memory objects used by the operating system and a second type-identifier code identifies memory objects used by the application programs.

10. The method of claim 1, wherein the one of the recovery actions comprises disregarding the error.

11. The method of claim 1, wherein the one of the recovery actions comprises signaling an application program if the address of the memory error is associated with a memory object allocated to the application program.

12. The method of claim 1, wherein the one of the recovery actions comprises halting the operating system.

13. The method of claim 1, wherein the one of the recovery actions comprises logging information that describes the memory error.

14. The method of claim 1, wherein an operating system manages resources of the data processing system for use by application programs executing on the data processing system, and a first type-identifier code identifies memory objects of a first type used by the operating system, a second type-identifier code identifies memory objects of a second type used by the operating system, a third type-identifier code identifies memory objects used by the application programs, and for errors in memory objects associated with the second type-identifier code, the one of the recovery actions logs information that describes the memory error.

15. An apparatus for managing memory of a data processing system, comprising:
   means for allocating memory objects in response to memory allocation requests, each object having an associated a plurality of addresses;
   means for storing type-identifier codes in association with memory objects, respectively, wherein each type-identifier code is a program counter value from which allocation of memory is requested; and
   means, responsive to a transient memory error at a memory address, for identifying the memory object associated with the memory address, obtaining the type-identifier code associated with the memory object, selecting one of a plurality of recovery actions using the type-identifier code as selection criteria, and performing the one of the recovery actions.

16. A processor-based method of managing memory of a data processing system, comprising:
   allocating memory objects by an operating system in response to random access memory (RAM) allocation requests, each object having an associated a plurality of RAM addresses, the memory allocation requests received from operating system processes and non-operating system processes;
   storing type-identifier codes in association with allocated memory objects, respectively, wherein a first type-identifier code identifies memory objects of a first type used by an operating system process, a second type-identifier code identifies memory objects of a second type used by an operating system process, and a third type-identifier code identifies memory objects used by a non-operating system process; and
   responsive to an error detected at a RAM memory address and not corrected, identifying the memory object associated with the RAM memory address, obtaining the type-identifier code associated with the memory object, selecting one of a plurality of recovery actions using the type-identifier code as selection criteria, halting the operating system process in response to an error detected for a memory object having an associated first type-identifier code, and logging information that describes the error in response to an error detected for a memory object having a second type-identifier code.

17. The method of claim 16 further comprising storing the type-identifier codes within the memory objects, respectively.

18. The method of claim 17, wherein the type-identifier code is a program counter value from which allocation of memory is requested.

19. The method of claim 17, further comprising responsive to an error detected at a RAM memory address and not corrected, signaling a non-operating system process in response to an error detected for a memory object having a third type-identifier code.

20. An apparatus for managing memory of a data processing system, comprising:
   means for allocating memory objects by an operating system in response to random access memory (RAM) allocation requests, each object having an associated a plurality of RAM addresses, the memory allocation requests received from operating system processes and non-operating system processes;
   means for storing type-identifier codes in association with allocated memory objects, respectively, wherein a first type-identifier code identifies memory objects of a first type used by an operating system process, a second type-identifier code identifies memory objects of a second type used by an operating system process, and a third type-identifier code identifies memory objects used by a non-operating system process; and
   means, responsive to an error detected at a RAM memory address and not corrected, for identifying the memory object associated with the RAM memory address, for obtaining the type-identifier code associated with the memory object, for selecting one of a plurality of recovery actions using the type-identifier code as selection criteria, for halting the operating system process in response to an error detected for a memory object having an associated first type-identifier code, and for logging information that describes the error in response to an error detected for a memory object having a second type-identifier code.

21. A program storage device, comprising:
   a processor-readable medium configured with instructions for causing a processor to manage memory of a data processing system by,
   allocating memory objects by an operating system in response to random access memory (RAM) allocation requests, each object having an associated a plurality of RAM addresses, the memory allocation requests received from operating system processes and non-operating system processes;
   storing type-identifier codes in association with allocated memory objects, respectively, wherein a first type-identifier code identifies memory objects of a first type used by an operating system process, a second type-identifier code identifies memory objects of a second type used by an operating system process, and a third type-identifier code identifies memory objects used by a non-operating system process; and
   responsive to an error detected at a RAM memory address and not corrected, identifying the memory object associated with the RAM memory address, obtaining the type-identifier code associated with the memory object, selecting one of a plurality of recovery actions using the type-identifier code as selection criteria, halting the operating system process in response to an error detected for a memory object having an associated first type-identifier code, and logging information that describes the error in response to an error detected for a memory object having a second type-identifier code.

* * * * *